(12) United States Patent
Kinoshita et al.

(10) Patent No.: US 10,315,523 B2
(45) Date of Patent: Jun. 11, 2019

(54) CONDUCTOR ARRANGEMENT STRUCTURE FOR WIRELESS POWER SUPPLY SYSTEM

(71) Applicant: NISSAN MOTOR CO., LTD., Yokohama-shi, Kanagawa (JP)

(72) Inventors: Takuya Kinoshita, Kanagawa (JP); Yukinori Tsukamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1 day.

(21) Appl. No.: 15/024,880

(22) PCT Filed: Sep. 27, 2013

(86) PCT No.: PCT/JP2013/076212
§ 371 (c)(1),
(2) Date: Mar. 25, 2016

(87) PCT Pub. No.: WO2015/045088
PCT Pub. Date: Apr. 2, 2015

(65) Prior Publication Data
US 2016/0236575 A1 Aug. 18, 2016

(51) Int. Cl.
*H02J 50/70* (2016.01)
*B60L 11/18* (2006.01)
(Continued)

(52) U.S. Cl.
CPC ......... *B60L 11/182* (2013.01); *B60L 11/1833* (2013.01); *H01F 27/2823* (2013.01); *H01F 27/34* (2013.01); *H01F 38/14* (2013.01); *H02J 5/005* (2013.01); *H02J 7/025* (2013.01); *H02J 50/10* (2016.02); *H02J 50/60* (2016.02); *H02J 50/70* (2016.02); *B60L 2240/36* (2013.01);
(Continued)

(58) Field of Classification Search
CPC ......... B60L 11/182; H02J 50/10; H02J 50/70; H02J 50/00
USPC .......................................................... 307/104
See application file for complete search history.

(56) References Cited

U.S. PATENT DOCUMENTS

| 9,099,239 | B2 | 8/2015 | Abe | |
| 2011/0084782 | A1* | 4/2011 | Kanno | H01Q 1/38 333/202 |
| 2012/0181980 | A1* | 7/2012 | Ichikawa | H02J 7/025 320/108 |
| 2013/0038279 | A1* | 2/2013 | Seyerle | B60R 16/033 320/108 |
| 2013/0099592 | A1 | 4/2013 | Abe | |

(Continued)

FOREIGN PATENT DOCUMENTS

| JP | 2011-082985 A | 4/2011 |
| JP | 2012-16125 A | 1/2012 |

(Continued)

*Primary Examiner* — Rexford N Barnie
*Assistant Examiner* — Joseph Inge
(74) *Attorney, Agent, or Firm* — Foley & Lardner LLP (57) ABSTRACT

A conductor arrangement structure for a wireless power supply system which is equipped with a ground-side device (3) that is installed on a ground side and has a power-feeding coil (L1) and a vehicle-side device (2) that is installed on a vehicle (1) and has a power-receiving coil (L2) and in which electric power is supplied from the ground-side device (3) to the vehicle-side device (2) without contact, wherein grounding wires (23) are arranged between the power-feeding coil (L1) and the power-receiving coil (L2) so as to extend over a high-potential portion and a low-potential portion of an electric field that is generated when the power-feeding coil (L1) is excited.

5 Claims, 8 Drawing Sheets

(51) Int. Cl.
  *H02J 50/60*   (2016.01)
  *H01F 38/14*   (2006.01)
  *H02J 5/00*    (2016.01)
  *H02J 7/02*    (2016.01)
  *H01F 27/28*   (2006.01)
  *H01F 27/34*   (2006.01)
  *H02J 50/10*   (2016.01)

(52) U.S. Cl.
  CPC ... *B60L 2270/147* (2013.01); *H01F 2027/348* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

2013/0169062 A1*  7/2013  Maikawa .............. H02J 50/10
                                                  307/104
2014/0042823 A1   2/2014  Nakahara et al.
2016/0016478 A1*  1/2016  Saito ................... B60L 11/182
                                                  307/104

FOREIGN PATENT DOCUMENTS

| JP | 2012-228148 A  | 11/2012 |
| JP | 2013-162644 A  | 8/2013  |
| WO | WO 2012/114191 A1 | 8/2012 |
| WO | WO 2015/008662 A1 | 1/2015 |

\* cited by examiner

43
CONTROLLER UNIT

CONDUCTOR ARRANGEMENT STRUCTURE FOR WIRELESS POWER SUPPLY SYSTEM

TECHNICAL FIELD

The present invention relates to a conductor arrangement structure for a wireless power supply system, and particularly to a technique for suppressing an increase in the voltage of a vehicle caused by the presence of a stray capacitance.

BACKGROUND ART

In a wireless power supply system in which a power-feeding coil installed on a ground side feeds power to a power-receiving coil installed on a vehicle without contact, there occurs a problem that a voltage is generated between the vehicle and the ground by a stray capacitance existing between the power-feeding coil and the power-receiving coil. As a conventional example of this type, for example, a technique disclosed in Patent Literature 1 is known. Patent Literature 1 discloses a technique for preventing a radiated electromagnetic field from being generated around a wireless power supply device.

CITATION LIST

Patent Literature

Patent Literature 1: Japanese Patent Application Publication No. 2012-228148

SUMMARY OF INVENTION

However, in the conventional example disclosed in Patent Literature 1, there is no mention about how to prevent a stray capacitance from generating voltage between the vehicle and the ground.

The present invention has been made to solve the above-described conventional problem. An object of the present invention is to provide a conductor arrangement structure for a wireless power supply system in which an increase in the voltage of a vehicle with respect to the ground caused by a stray capacitance is suppressed.

A conductor arrangement structure for a wireless power supply system according to one aspect of the present invention is a conductor arrangement structure for a wireless power supply system which is equipped with a power-feeding device having a power-feeding coil and a power-receiving device having a power-receiving coil and in which electric power is supplied from the power-feeding device to the power-receiving device without contact. A conductor is arranged between the power-feeding coil and the power-receiving coil so as to extend over a high-potential portion and a low-potential portion of an electric field that is generated when the power-feeding coil is excited.

DESCRIPTION OF EMBODIMENTS

Hereinafter, embodiments of the present invention will be described with reference to the drawings.

[First Embodiment]

Figure 1:
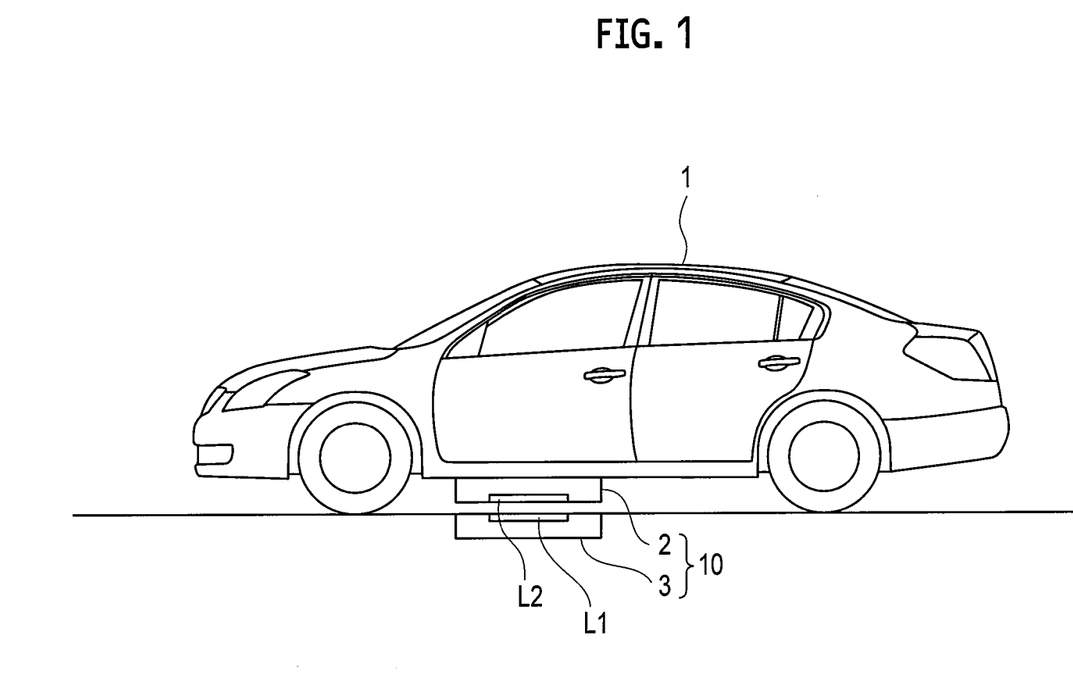
FIG. 1 is an explanatory view showing a schematic configuration of a wireless power supply system in which a conductor arrangement structure according to an embodiment of the present invention is employed.

FIG. 1 is an explanatory view showing a schematic configuration of a wireless power supply system in which a conductor arrangement structure according to a first embodiment of the present invention is employed. As shown in FIG. 1, a wireless power supply system 10 includes a ground-side device 3 (power-feeding device) installed on a ground side and a vehicle-side device 2 (power-receiving device) mounted on a vehicle 1. A power-feeding coil L1 is mounted on the ground-side device 3, and a power-receiving coil L2 is provided in the vehicle-side device 2. The power-feeding coil L1 and the power-receiving coil L2 are caused to face each other by moving the vehicle 1. In this state, the power-feeding coil L1 is excited in the ground-side device 3 to feed power. The power-receiving coil L2 receives the power, and the received power is charged in a battery (not shown) mounted on the vehicle. Accordingly, the battery mounted on the vehicle 1 can be charged without the need for a connecting operation such as plug connection.

Figure 2:
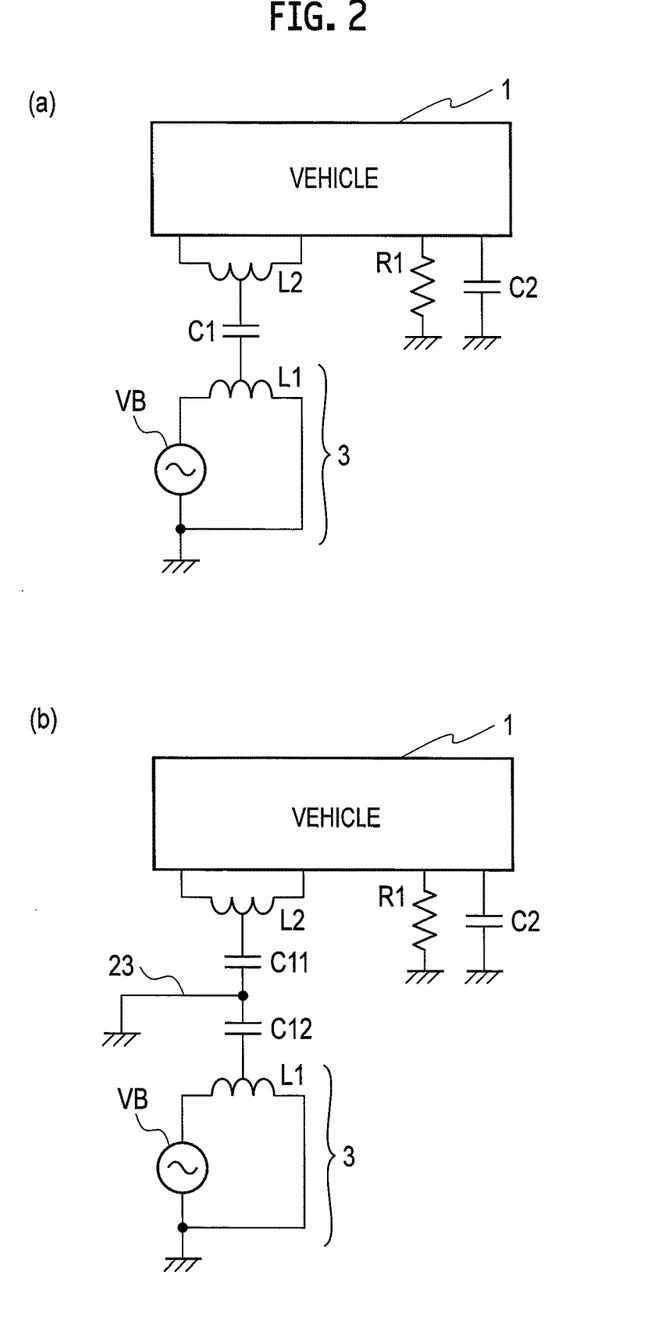
FIG. 2 is an explanatory diagram showing a principle on which the conductor arrangement structure according to an embodiment of the present invention suppresses an increase in the voltage of a vehicle.

FIG. 2 is an explanatory diagram showing a principle on which the conductor arrangement structure according to the present invention prevents an increase in the voltage of the vehicle 1 during wireless power feeding. FIG. 2A shows a case where the present invention is not employed, and FIG. 2B shows a case where the present invention is employed.

First, the case where the present invention is not employed will be described. As shown in FIG. 2A, the wireless power supply system comes into a state in which the power-feeding coil L1 provided in the ground-side device 3 and the power-receiving coil L2 provided in the vehicle-side device 2 face each other. Accordingly, a stray capacitance C1 arises between the power-feeding coil L1 and the power-receiving coil L2. Further, a resistance R1 and a stray capacitance C2 exist between the vehicle 1 and the ground.

Thus, when a voltage is applied to the power-feeding coil L1 from the battery VB provided in the ground-side device 3 to pass an electric current through the power-feeding coil L1, the voltage of the power-receiving coil L2 increases due to the existence of stray capacitance C1, and consequently the voltage of the vehicle 1 with respect to the ground increases.

Next, the case where the conductor arrangement structure according to the present embodiment is employed will be described. In the present embodiment, a linear grounding wire 23 (conductor) is arranged between the power-feeding coil L1 and the power-receiving coil L2. Accordingly, as shown in FIG. 2B, the stray capacitance C1 shown in FIG. 2A is divided into two stray capacitances C11 and C12, and a junction point therebetween is connected to the ground. Thus, a voltage of the stray capacitance C11 generated by exciting the power-feeding coil L1 can be dumped to the ground, and an increase in the voltage of the vehicle 1 can be prevented.

Figure 3:
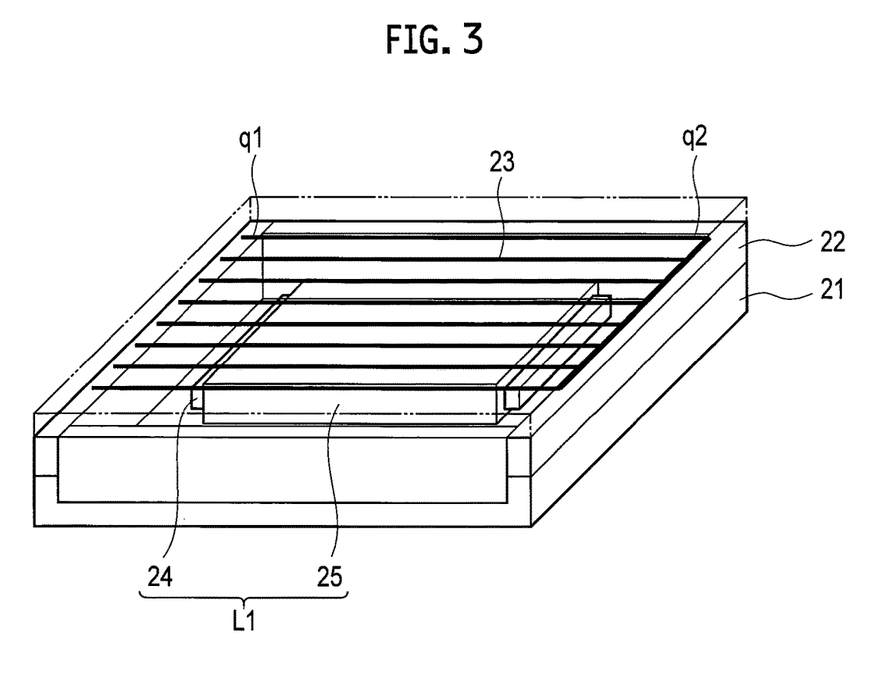
FIG. 3 is a perspective view showing the configuration of a power-feeding device including a conductor arrangement structure according to a first embodiment of the present invention.
Figure 4:
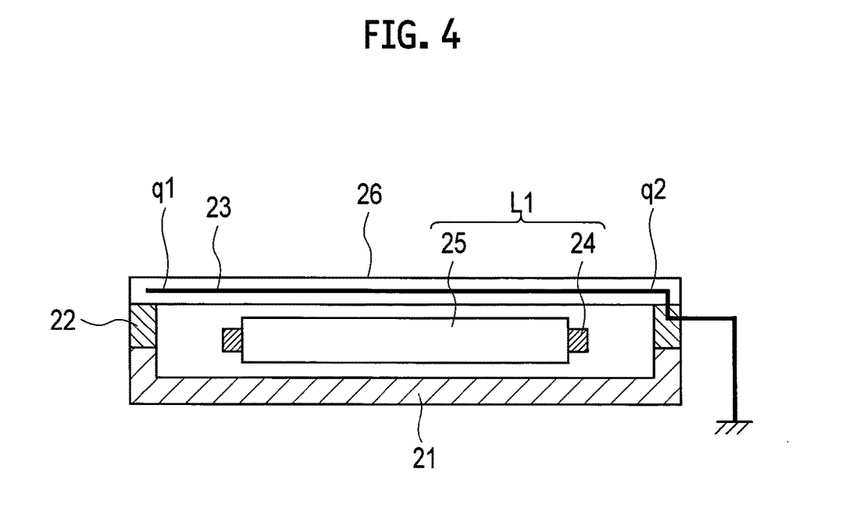
FIG. 4 is a cross-sectional view showing the configuration of the power-feeding device including the conductor arrangement structure according to the first embodiment of the present invention.

Hereinafter, a specific configuration of the conductor arrangement structure according to the present embodiment will be described. FIG. 3 is a perspective view showing the power-feeding coil L1 provided in the ground-side device and an arrangement structure of grounding wires 23 provided near the foregoing, and FIG. 4 is a cross-sectional view. As shown in FIG. 3, the ground-side device includes a rectangular housing frame 21, and the power-feeding coil L1 is placed in the housing frame 21. The power-feeding coil L1 is formed by winding an electric wire 25 around an iron core 24.

Figure 5:
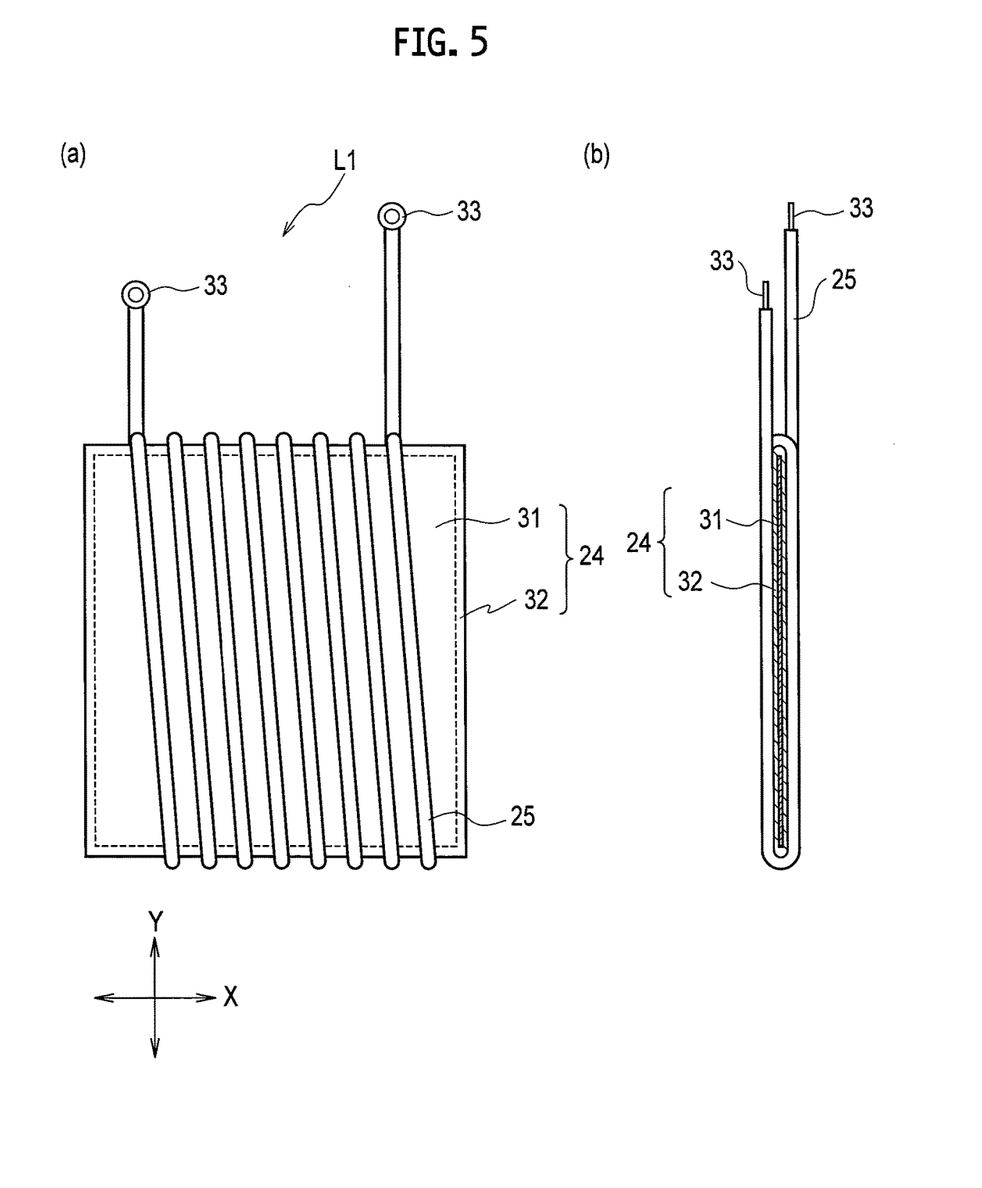
FIG. 5 includes a plan view and a side view showing the configuration of a power-feeding coil of the power-feeding device in which the conductor arrangement structure according to the first embodiment of the present invention is employed.

FIG. 5 is an explanatory diagram showing a detailed configuration of the power-feeding coil L1. FIG. 5A is a plan view, and FIG. 5B is a side view. As shown in FIGS. 5A and 5B, the iron core 24 has a configuration in which an insulator 32 is wrapped around ferrite 31 in the form of a flat plate, and the electric wire 25 is helically wound around the iron core 24. Further, terminals 33 are provided at two ends of the electric wire 25. Accordingly, the power-feeding coil L1 can be excited by supplying voltages to the terminals 33. Specifically, the winding direction of the electric wire 25 is the Y direction in the drawing, and the direction of magnetic flux generated in the power-feeding coil L1 is the X direction, which is perpendicular to the Y direction.

Moreover, a magnetic shielding wall 22 in the shape of a rectangular frame is provided on the housing frame 21 shown in FIGS. 3 and 4. The magnetic shielding wall 22 is made of a material with high conductivity and low magnetic permeability such as aluminum. Further, a lid member 26 made of resin is provided so as to cover an upper surface of the magnetic shielding wall 22, and a plurality of grounding wires 23 are arranged in the lid member 26 to be evenly spaced. Specifically, the plurality of grounding wires 23 are molded and arranged inside the lid member 26 made of resin.

All of one end portions (reference sign q1 side in the drawings) of the grounding wires 23 are open-circuited. Moreover, all of other end portions (q2 side in the drawings) are short-circuited, and short-circuited points thereof are connected to the magnetic shielding wall 22 and further connected to the ground. Accordingly, all of the magnetic shielding wall 22 and the grounding wires 23 are at ground potential.

As a result, as shown in the aforementioned FIG. 2B, a configuration is obtained in which the plurality of grounding wires 23 are arranged between the power-feeding coil L1 and the power-receiving coil L2, and an increase in the voltage of the vehicle 1 can be prevented with the stray capacitance between the power-feeding coil L1 and the power-receiving coil L2.

Figure 6:
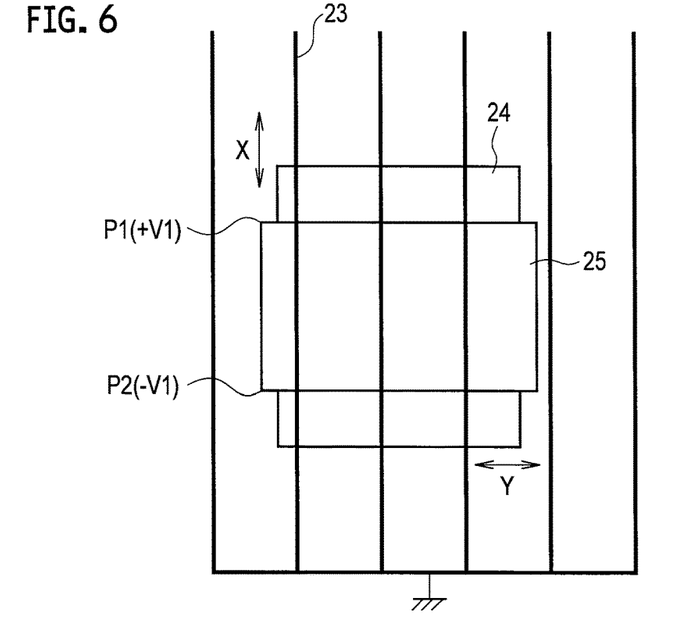
FIG. 6 is a diagram showing the conductor arrangement structure according to the first embodiment of the present invention in which grounding wires are arranged parallel to lines of electric force.

FIG. 6 shows an example in which the arrangement direction of the grounding wires 23 is parallel to the direction (X direction in the drawing) of magnetic flux generated in the power-feeding coil L1 shown in FIGS. 3 and 4. Specifically, the grounding wires 23 are arranged so as to extend over a high-potential portion P1 (a voltage of +V1 volts) and a low-potential portion P2 (a voltage of −V1 volts) of an electric field that is generated when the power-feeding coil L1 is excited. Moreover, lines of electric force generated around the power-feeding coil L1 are generated in the direction from point P1 to point P2, i.e., in the same direction as magnetic flux. In the example shown in FIG. 6, the grounding wires 23 are arranged parallel to the direction of the lines of electric force.

As described above, by arranging the grounding wires 23 parallel to the lines of electric force, the grounding wires 23 (conductors) are arranged so as to extend over the high-potential portion and the low-potential portion of the electric field that is generated when the power-feeding coil L1 is excited. Accordingly, a path between a high-potential portion and a low-potential portion in the grounding wire 23 is short, and electrical resistance in the grounding wire 23 can be made small. Thus, a voltage generated by the parasitic capacitance between the power-feeding coil L1 and the power-receiving coil L2 can be easily dumped to the ground. Accordingly, an increase in the voltage of the vehicle 1 with respect to the ground can be suppressed.

Moreover, because of one end portions of the plurality of grounding wires 23 being open-circuited, other end portions being short-circuited, and the short-circuited points thereof being connected to the ground, there is no closed loop formed by the grounding wires 23, and the generation of an eddy current is inhibited. Accordingly, an unnecessary increase in temperature can be prevented.

Figure 7:
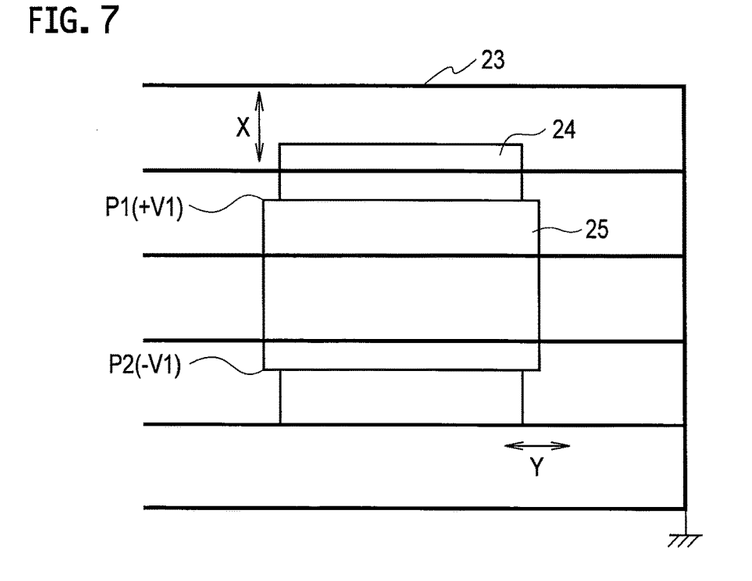
FIG. 7 is a diagram showing a conductor arrangement structure according to a comparative example in which grounding wires are arranged perpendicular to the lines of electric force.

FIG. 7 is an explanatory diagram showing a comparative example for comparison with the above-described FIG. 6. Specifically, in FIG. 6, an example has been shown in which the grounding wires 23 are arranged so as to extend over the high-potential portion P1 and the low-potential portion P2 of the electric field that is generated when the power-feeding coil L1 is excited. Meanwhile, in the comparative example shown in FIG. 7, the grounding wires 23 are arranged not to extend over the high-potential portion and the low-potential portion. Specifically, an example is shown in which the direction (X direction in the drawings) of magnetic flux generated in the power-feeding coil L1 shown in FIGS. 3 and 4 are perpendicular to the arrangement direction of the grounding wires 23. In this case, lines of electric force generated around the power-feeding coil L1 are generated in the direction from point P1 to point P2. In the example shown in FIG. 7, the grounding wires 23 are arranged perpendicular to the direction of the lines of electric force. In the comparative example having the above-described configuration, electrical resistance in the grounding wire 23 cannot be made small. Thus, the effect of the present invention which facilitates the dumping of a voltage generated by the parasitic capacitance between the power-feeding coil L1 and the power-receiving coil L2 to the ground cannot be achieved.

Figure 9:
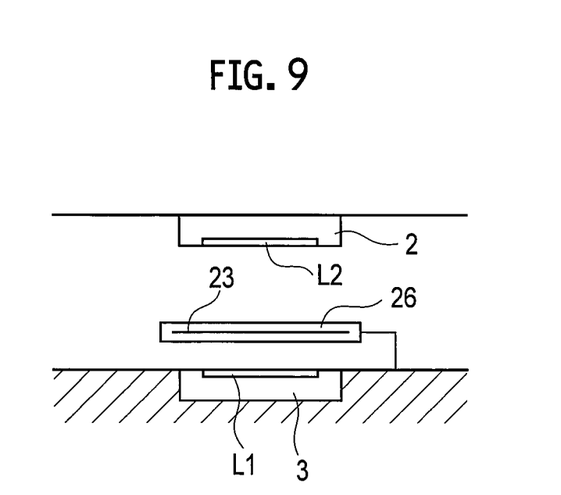
FIG. 9 is an explanatory diagram schematically showing the conductor arrangement structure according to the first embodiment of the present invention.

Specifically, in the conductor arrangement structure according to the first embodiment, as shown in FIG. 9, the lid member 26 having the grounding wires 23 arranged therein is provided between the power-feeding coil L1 and the power-receiving coil L2, and, further, the grounding wires 23 are arranged so as to extend over the high-potential portion and the low-potential portion of the electric field that is generated when the power-feeding coil L1 is excited. Accordingly, a voltage generated by a stray capacitance can be dumped to the ground, and an increase in the potential of the vehicle 1 can be prevented.

It should be noted that in the above-described embodiment, an example has been illustrated in which the direction of lines of electric force generated when the power-feeding coil L1 is excited are parallel to the direction of the grounding wires 23. However, the direction of lines of electric force may be at an oblique angle to the direction of the grounding wires 23. Specifically, the direction arranging the grounding wires 23 may be a direction inclined at a predetermined angle to the direction of magnetic flux (X direction) or the winding direction (Y direction).

[Second Embodiment]

Next, a conductor arrangement structure according to a second embodiment of the present invention will be described. In the second embodiment, a description will be made for the case where the grounding wires 23 shown in the first embodiment are arranged in the ground-side device 3 having a search coil mounted thereon for detecting the presence of a foreign substance around the power-feeding coil L1.

Figure 8:
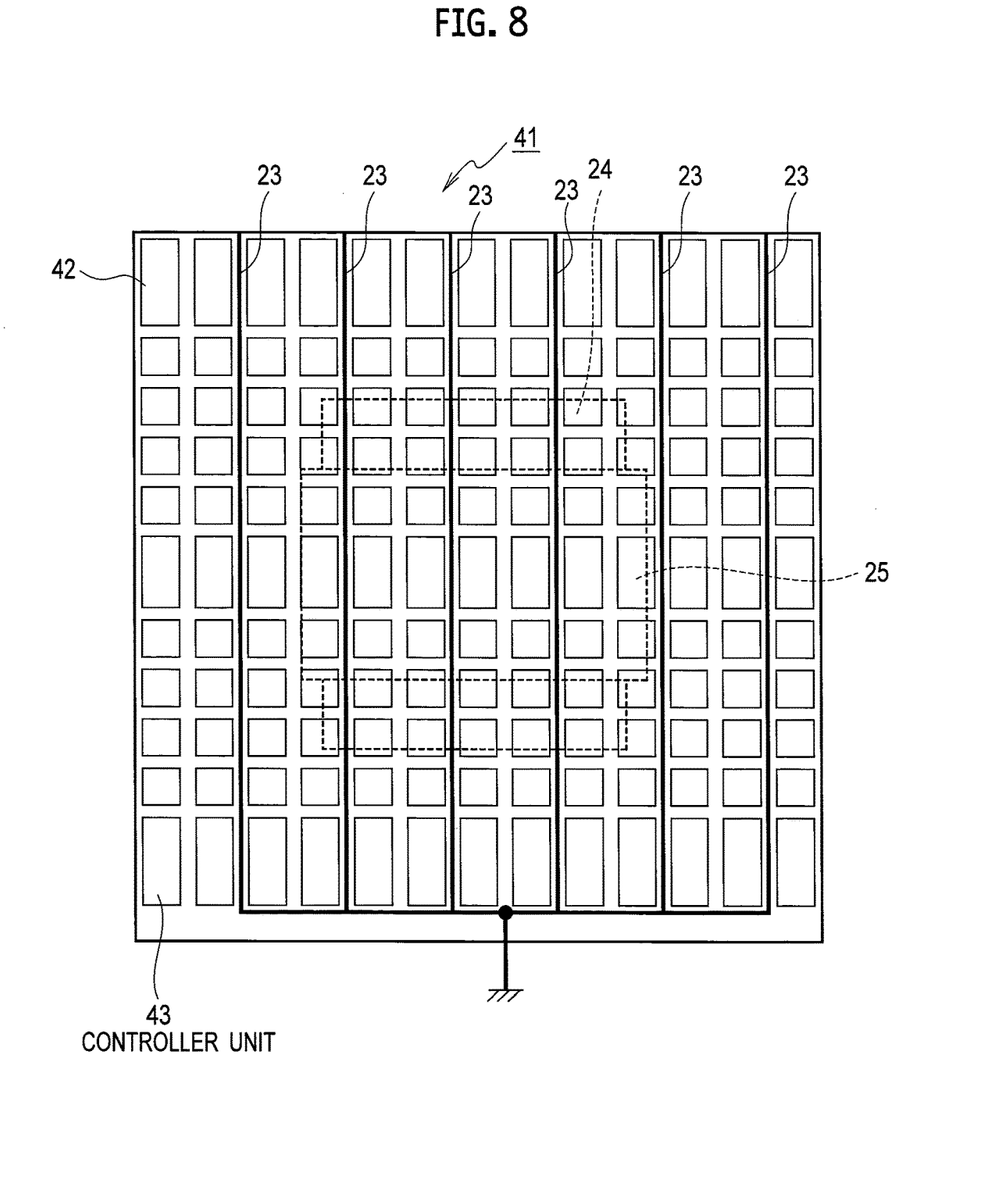
FIG. 8 is an explanatory diagram showing a conductor arrangement structure according to a second embodiment of the present invention in which grounding wires are arranged on a search coil substrate.

FIG. 8 is a plan view showing the configuration of a search coil substrate 41. As shown in FIG. 8, a plurality of rectangular sensor coils 42 arranged in the vertical and horizontal directions are provided on the search coil substrate 41. The search coil substrate 41 is placed on the side of an upper surface of the power-feeding coil L1. Before power feed between the power-feeding coil L1 and the power-receiving coil L2 is started, a feeble current is passed through the power-feeding coil L1. Then, a controller unit 43 performs control to read changes in voltage generated in the sensor coils 42. Based on the changes in voltage, a determination is made as to whether or not there is a foreign substance such as an empty can, a bolt, a metal piece, or the like in the vicinity of the power-feeding coil L1. Specifically, in the case where there is a foreign substance made of metal in the vicinity of the power-feeding coil L1, an eddy current may be generated in the foreign substance to generate heat; and, therefore, to prevent this problem, the search coil substrate 41 is used to detect the presence of a foreign substance.

In the second embodiment, grounding wires 23 are provided on the search coil substrate 41. Specifically, as shown in FIG. 8, a plurality of grounding wires 23 are arranged on the search coil substrate 41 to be evenly spaced and parallel. Further, as shown in the aforementioned FIG. 3, all of one end portions of the grounding wires 23 are open-circuited, all of other end portions are short-circuited, and short-circuited points thereof are connected to the ground. Moreover, the grounding wires 23 are arranged so as to extend over a high-potential portion and a low-potential portion of an electric field that is generated when the power-feeding coil L1 is excited. Thus, as in the aforementioned first embodiment, since the grounding wires 23 are arranged between the power-feeding coil L1 and the power-receiving coil L2, the generation of a voltage caused by a stray capacitance between the power-feeding coil L1 and the power-receiving coil L2 can be suppressed. As a result, an increase in the voltage of the vehicle 1 can be suppressed.

Figure 10:
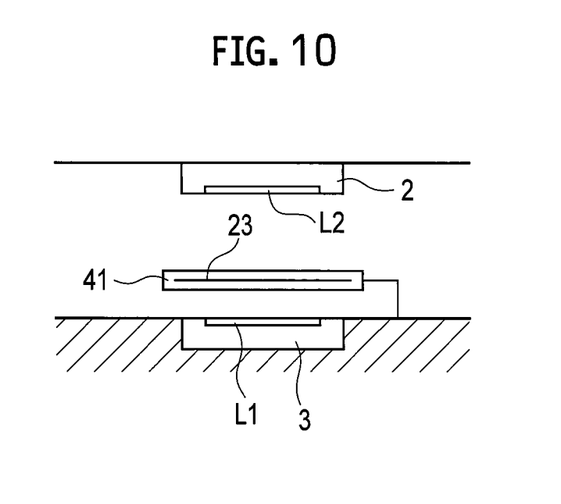
FIG. 10 is an explanatory diagram schematically showing the conductor arrangement structure according to the second embodiment of the present invention.

Specifically, in the conductor arrangement structure according to the second embodiment, as shown in FIG. 10, since the search coil substrate 41 having the grounding wires 23 arranged therein is provided between the power-feeding coil L1 and the power-receiving coil L2, a voltage generated by a stray capacitance can be dumped to the ground, and an increase in the potential of the vehicle 1 can be prevented. Moreover, since the grounding wires 23 are mounted on the search coil substrate 41, there is no need to fabricate a substrate dedicated to the grounding wires 23, and the device configuration can be simplified.

Figure 11:
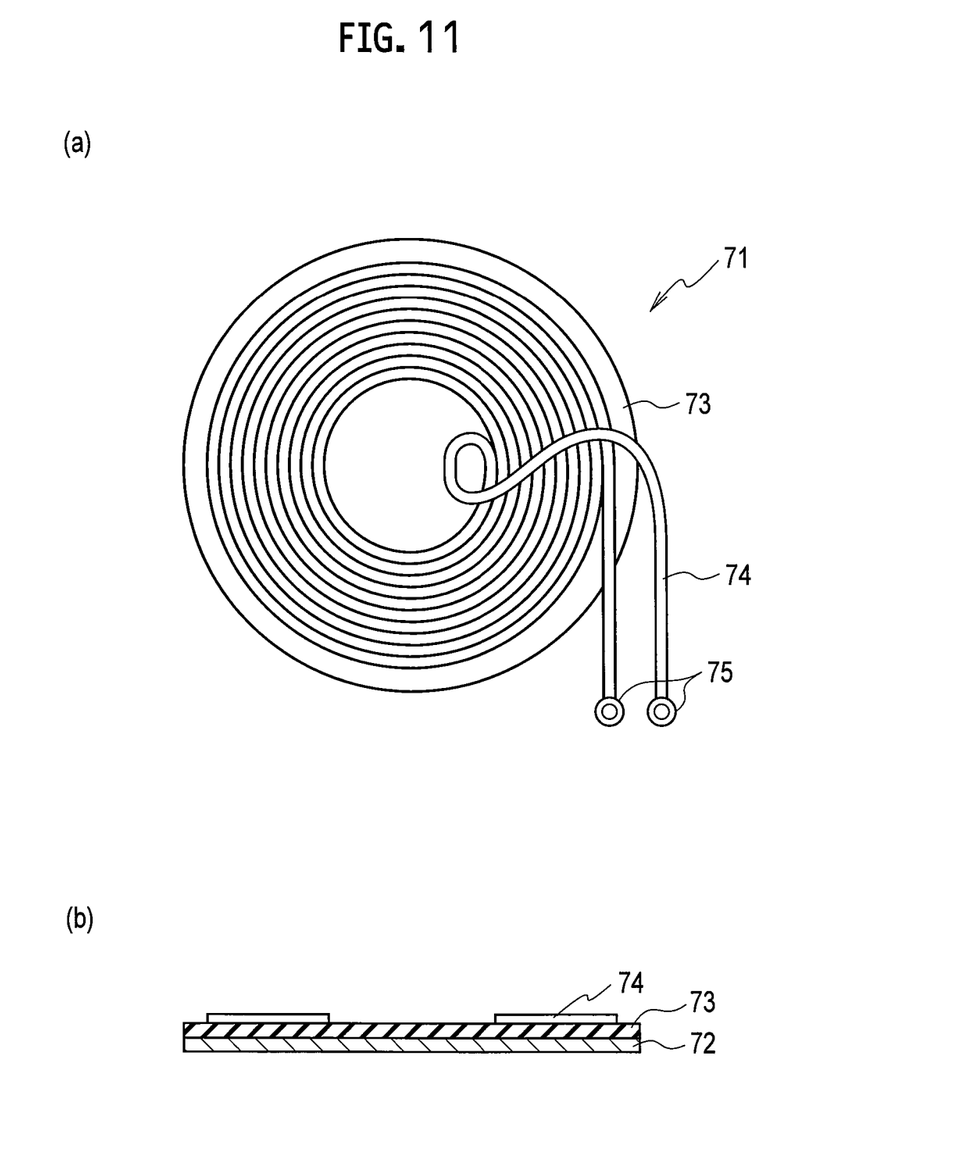
FIG. 11 includes a plan view and a cross-sectional view showing the configuration of a disk coil.

It should be noted that though examples in which a solenoid coil such as shown in FIG. 5 is used as the power-feeding coil L1 have been described in the above-described first and second embodiments, the present invention is not limited to this. For example, as shown in FIG. 11, a disk coil 71 may also be used. In FIG. 11, the disk coil 71 has ferrite 72, and an insulating material 73 is provided on a surface of the ferrite 72. Further, an electric wire 74 is wound in a spiral shape on a surface of the insulating material 73, and terminals 75 are provided at both ends of the electric wire 74. In the case where the disk coil 71 thus configured is used as a power-feeding coil, an increase in the voltage of the vehicle 1 can be suppressed by arranging grounding wires between the power-feeding coil and the power-receiving coil.

While the conductor arrangement structure of the wireless power supply system of the present invention has been described based on the illustrated embodiments, the present invention is not limited to these. The configuration of each portion can be replaced by any configuration having equivalent functions.

For example, though the above-described first and second embodiments each have a configuration in which the grounding wires 23 are provided in a substrate, the present invention is not limited to this, and can also employ a configuration in which covered or non-covered grounding wires are provided in the vicinity of the power-feeding coil L1. Moreover, a configuration can also be employed in which grounding wires are arranged along a back surface (side surface of the power-feeding coil L1) of the lid member 26 made of resin according to the first embodiment, or a metal print having a pattern such as shown in FIG. 6 can also be formed on the back surface of the lid member to form grounding wires.

INDUSTRIAL APPLICABILITY

The present invention can be used to suppress an increase in the voltage of a vehicle when a battery is charged in a wireless power supply system.

REFERENCE SIGNS LIST

1 VEHICLE
2 VEHICLE-SIDE DEVICE (POWER-RECEIVING DEVICE)
3 GROUND-SIDE DEVICE (POWER-FEEDING DEVICE)
10 WIRELESS POWER SUPPLY SYSTEM
21 HOUSING FRAME
22 MAGNETIC SHIELDING WALL
23 GROUNDING WIRE (CONDUCTOR)

24 IRON CORE
25 ELECTRIC WIRE
26 LID MEMBER
31 FERRITE
32 INSULATOR
33 TERMINAL
41 SEARCH COIL SUBSTRATE
42 SENSOR COIL
43 CONTROLLER UNIT
71 DISK COIL
72 FERRITE
73 INSULATING MATERIAL
74 ELECTRIC WIRE
75 TERMINAL
L1 POWER-FEEDING COIL
L2 POWER-RECEIVING COIL

The invention claimed is:

1. A wireless power supply system which is equipped with a power-feeding device that is installed on a ground side and has a power-feeding coil and a power-receiving device that is installed on a vehicle and has a power-receiving coil and in which electric power is supplied from the power-feeding device to the power-receiving device without contact, comprising a conductor arrangement structure wherein a conductor having a linear shape is arranged between the power-feeding coil and the power-receiving coil so as to extend linearly over a high-potential portion and a low-potential portion of an electric field that is generated when the power-feeding coil is excited, wherein one end portion of the conductor is open-circuited, and an other end portion of the conductor is connected to ground, wherein the power-feeding device includes a housing frame in which the power-feeding coil is placed, the conductor is arranged inside a lid member made of resin provided so as to cover the housing frame, and is arranged above the power-feeding coil, wherein the conductor is arranged parallel to lines of electric force generated in the electric field and extends over the high-potential portion and the low-potential portion of the electric field so as to dump the voltage generated by the parasitic capacitance between the power-feeding coil and the power-receiving coil to the ground.

2. The wireless power supply system according to claim 1, wherein a plurality of the conductors are arranged parallel to lines of electric force generated in the electric field.

3. The wireless power supply system according to claim 1, wherein a plurality of the conductors are arranged parallel to each other, all of one end portions of the conductors are open-circuited, all of other end portions of the conductors are short-circuited, and short-circuited points of the other end portions are connected to ground.

4. The wireless power supply system according to claim 1, including a search coil substrate to detect presence of a foreign substance near the power-feeding coil, and the conductor is arranged in the search coil substrate.

5. The wireless power supply system according to claim 1, wherein a plurality of the conductors are arranged parallel to lines of electric force generated in the electric field and extend over the high-potential portion and the low-potential portion of the electric field so as to dump the voltage generated by the parasitic capacitance between the power-feeding coil and the power-receiving coil to the ground.

* * * * *